United States Patent [19]

Hauser

[11] Patent Number: 5,613,409
[45] Date of Patent: Mar. 25, 1997

[54] AXLE DRIVING APPARATUS HAVING IMPROVED CASING DESIGN

[75] Inventor: Ray Hauser, Decatur, Ill.

[73] Assignee: Hydro-Gear Limited Partnership, Sullivan, Ill.

[21] Appl. No.: 430,360

[22] Filed: Apr. 28, 1995

[51] Int. Cl.$^6$ .................................................. F16H 57/02
[52] U.S. Cl. .......................... 74/606 R; 60/487; 60/488; 60/490
[58] Field of Search ................................. 74/606 R, 607; 60/487, 488, 490; 91/499

[56] References Cited

U.S. PATENT DOCUMENTS

| | | | |
|---|---|---|---|
| 4,726,256 | 2/1988 | Von Kaler et al. | 74/606 R |
| 4,843,818 | 7/1989 | Thoma et al. | 60/488 |
| 4,867,008 | 9/1989 | Yamaoka et al. | 74/606 R |
| 4,891,943 | 1/1990 | Okada | 60/464 |
| 4,899,541 | 2/1990 | Okada | 60/464 |
| 4,903,545 | 2/1990 | Louis | 74/606 R |
| 4,905,472 | 3/1990 | Okada | 60/464 |
| 4,914,907 | 4/1990 | Okada | 60/487 |
| 4,932,209 | 6/1990 | Okada | 60/487 |
| 4,953,426 | 9/1990 | Johnson | 74/606 R |
| 4,979,583 | 12/1990 | Thoma et al. | 180/62 |
| 5,042,252 | 8/1991 | Havens et al. | 60/487 |
| 5,128,966 | 7/1992 | Von Kaler et al. | 74/606 R |
| 5,146,748 | 9/1992 | Okada | 60/454 |
| 5,156,576 | 10/1992 | Johnson | 475/72 |
| 5,201,692 | 4/1993 | Johnson et al. | 475/74 |
| 5,330,394 | 7/1994 | Hauser et al. | 475/230 |
| 5,335,496 | 8/1994 | Azuma | 60/487 |
| 5,339,631 | 8/1994 | Ohashi | 60/487 |
| 5,377,487 | 1/1995 | Azuma | 60/487 |

Primary Examiner—Vinh T. Luong
Attorney, Agent, or Firm—Gary R. Jarosik; Thomas C. McDonough

[57] ABSTRACT

An axle driving apparatus is provided an includes a main casing, a cap plate coupled to the main casing along a first split line where the first split line is substantially disposed in a horizontal plane, and an axle cap coupled to the main casing along a second split line where the second split line is substantially disposed in a vertical plane. A center section is supported solely by the main casing and has connected thereto a hydraulic pump and a hydraulic motor where the center section is disposed offset from both the first split line and the second split line. A pump shaft is linked to the hydraulic pump and is supported by the main casing where the pump shaft has an axis disposed perpendicular to the horizontal plane and parallel to and offset from the vertical plane. A motor shaft is linked to the hydraulic motor and has an axis parallel to and offset from the horizontal plane and perpendicular to the vertical plane. An axle is linked to the motor shaft and includes a first shaft section and a second shaft section wherein the first shaft section is supported solely by the main casing and the second shaft section is supported solely by the axle cap and further wherein the axle has an axis parallel to and offset from the horizontal plane and perpendicular to the vertical plane.

19 Claims, 5 Drawing Sheets

AXLE DRIVING APPARATUS HAVING IMPROVED CASING DESIGN

BACKGROUND OF THE INVENTION

This invention relates generally to an axle driving apparatus and, more particularly, relates to an integrated hydrostatic transaxle having an improved casing design.

Conventional hydrostatic transaxles are well known in the art. Examples of such transaxles and their operation may be seen in U.S. Pat. No. 5,330,394 to Hauser et al. The '394 patent is directed to a "Rider Transaxle Having Improved Hydrostatic Transmission" which patent is incorporated herein by reference in its entirety. These axle driving apparatuses are mainly used in small-sized vehicles, such as a mower tractor or the like. In their construction, the casing of the axle driving apparatus is typically formed by joining two main casing halves with each other, the junction surface therebetween commonly being referred to as the "split line".

Prior art casing designs are known to have several disadvantages. An example of one such disadvantage is fluid leakage. In particular, it has been noticed that when a shaft associated with the hydrostatic transmission or axle driving mechanism extends from the casing while being disposed on a spit line there is a tendency for hydraulic fluid and/or lubricating fluid to leak from the casing. This problem is typically caused as the half-rounds which support the shaft seals have a tendency to be misaligned when the casing halves are joined. Furthermore, as the known prior art designs require multiple casing sections to hold and maintain both the hydrostatic transmission and the axle driving mechanism, it is seen that there exists an increased cost in construction and increased weight owing to the required strength of the materials which are used therefor. In addition, it has also been seen that the use of multiple casing sections diminishes the structural integrity of the overall device.

As a result of these disadvantages, it is an object of the present invention to provide an improved axle driving apparatus casing which eliminates the problem associated with leakage caused by half-round misalignment. It is also an object of the present invention to provide an improved casing in which assembly of the component parts thereinto is simplified. It is yet another object of the present invention to provide a casing having improved structural integrity. It is still a further object of the present invention to provide an improved casing with reduced manufacturing cost and weight.

SUMMARY OF THE INVENTION

In accordance with these objects, an axle driving apparatus is provided and includes a main casing, a cap plate coupled to the main casing along a first split line, the first split line being substantially disposed in a horizontal plane, an axle cap coupled to the main casing along a second split line, the second split line being substantially disposed in a vertical plane, and a center section disposed within and supported by the main casing alone.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiment shown in the following drawings in which.

DETAILED DESCRIPTION

While the invention can be used in conjunction with most axle driving apparatuses it will be described hereinafter in the context of an integral hydrostatic transaxle as the preferred embodiment thereof.

Figure 1:
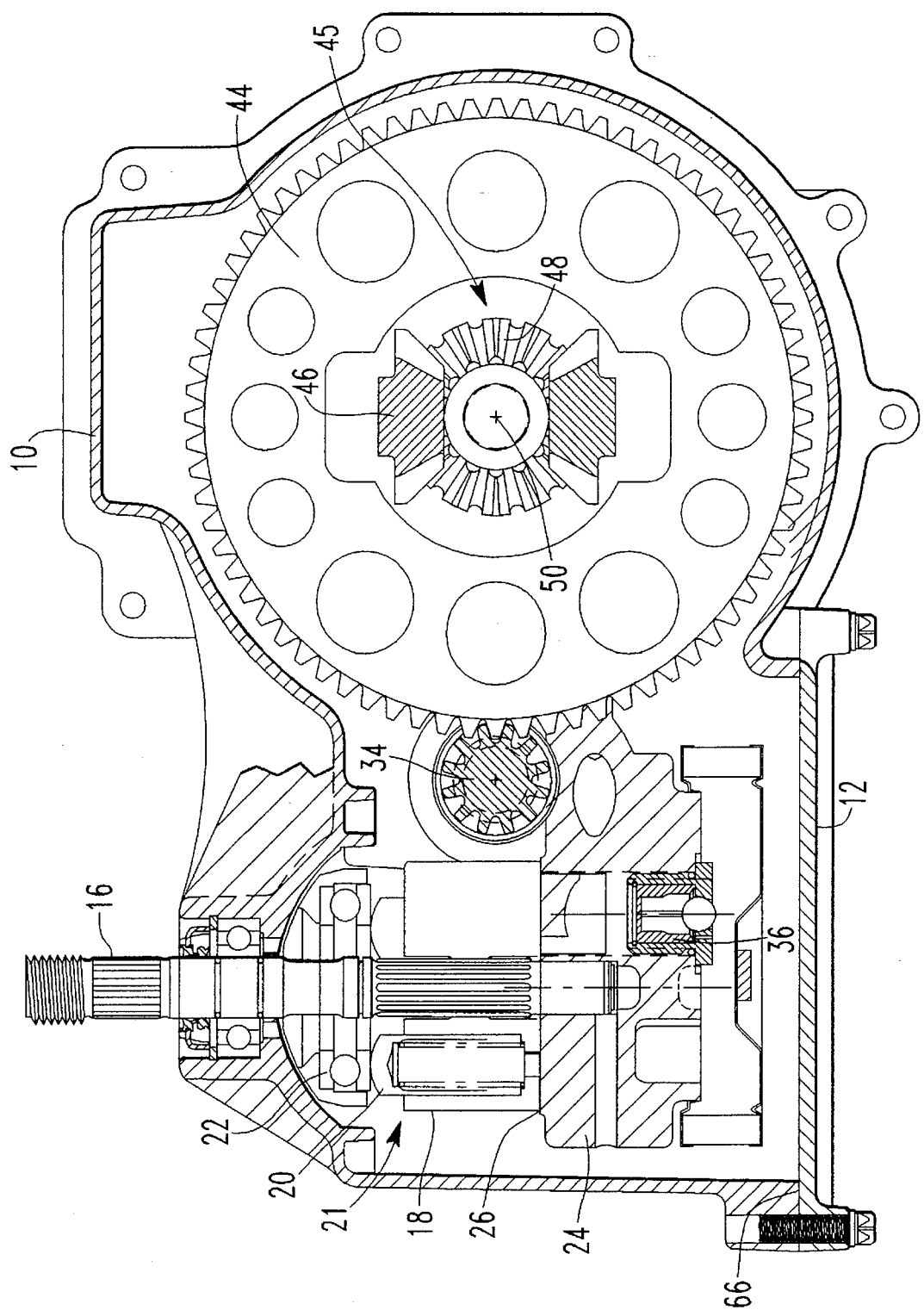
FIG. 1 is a sectional, side view of the axle driving apparatus which is the subject of the present invention.
Figure 2:
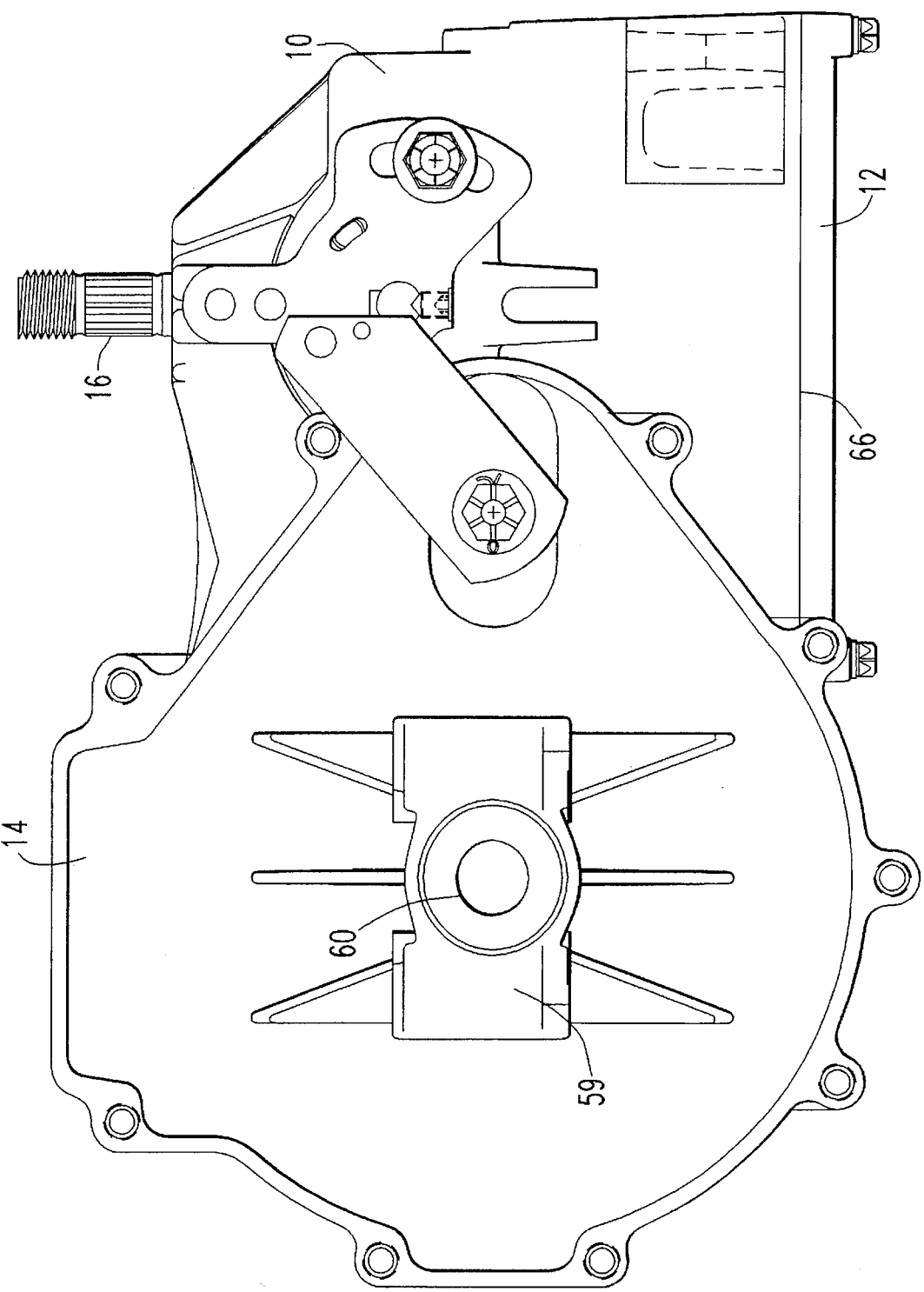
FIG. 2 is an opposite side view of the axle driving apparatus shown in FIG. 1.
Figure 3:
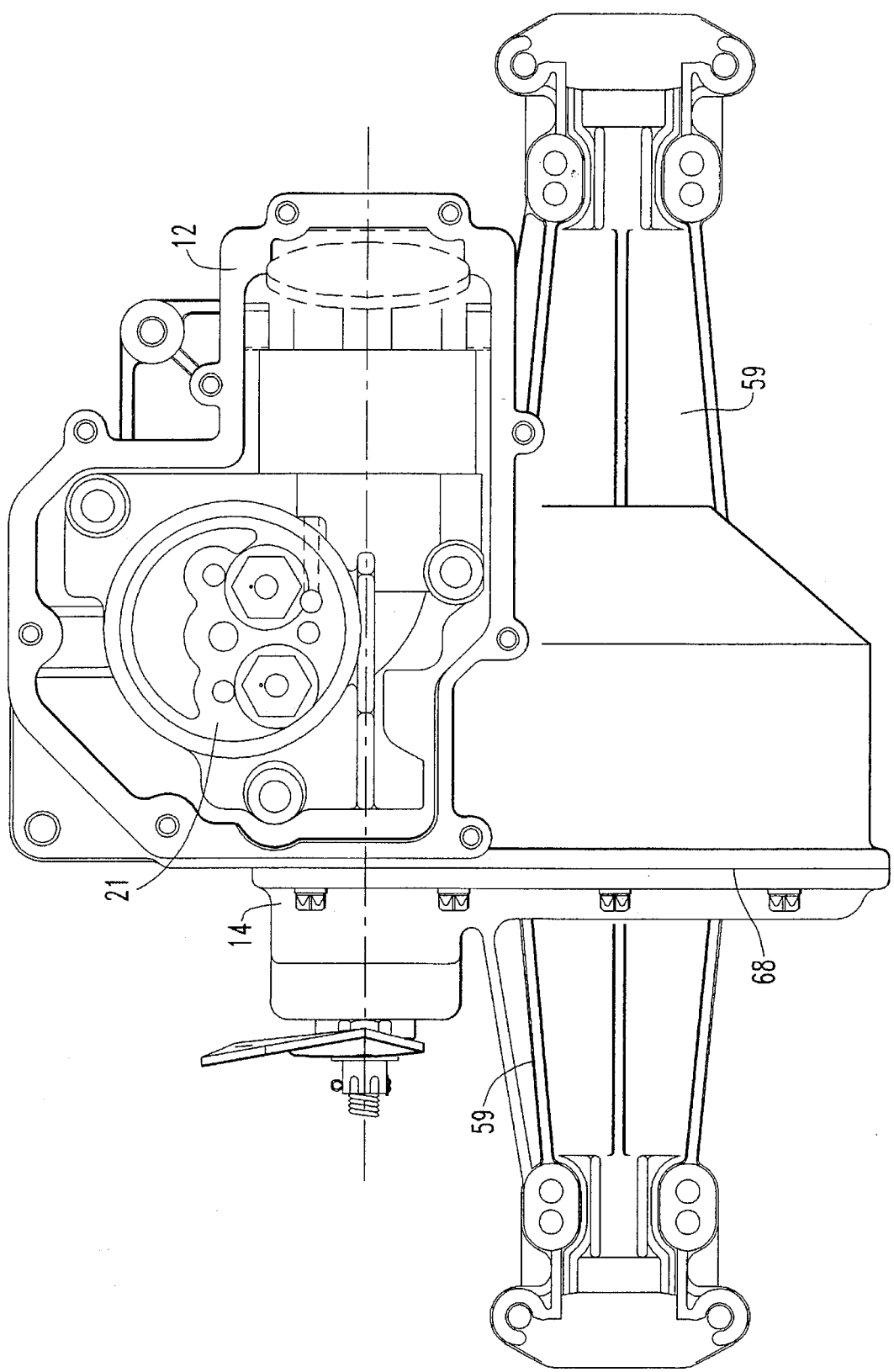
FIG. 3 is a partial sectional, bottom view of the axle driving apparatus shown in FIG. 1.
Figure 4:
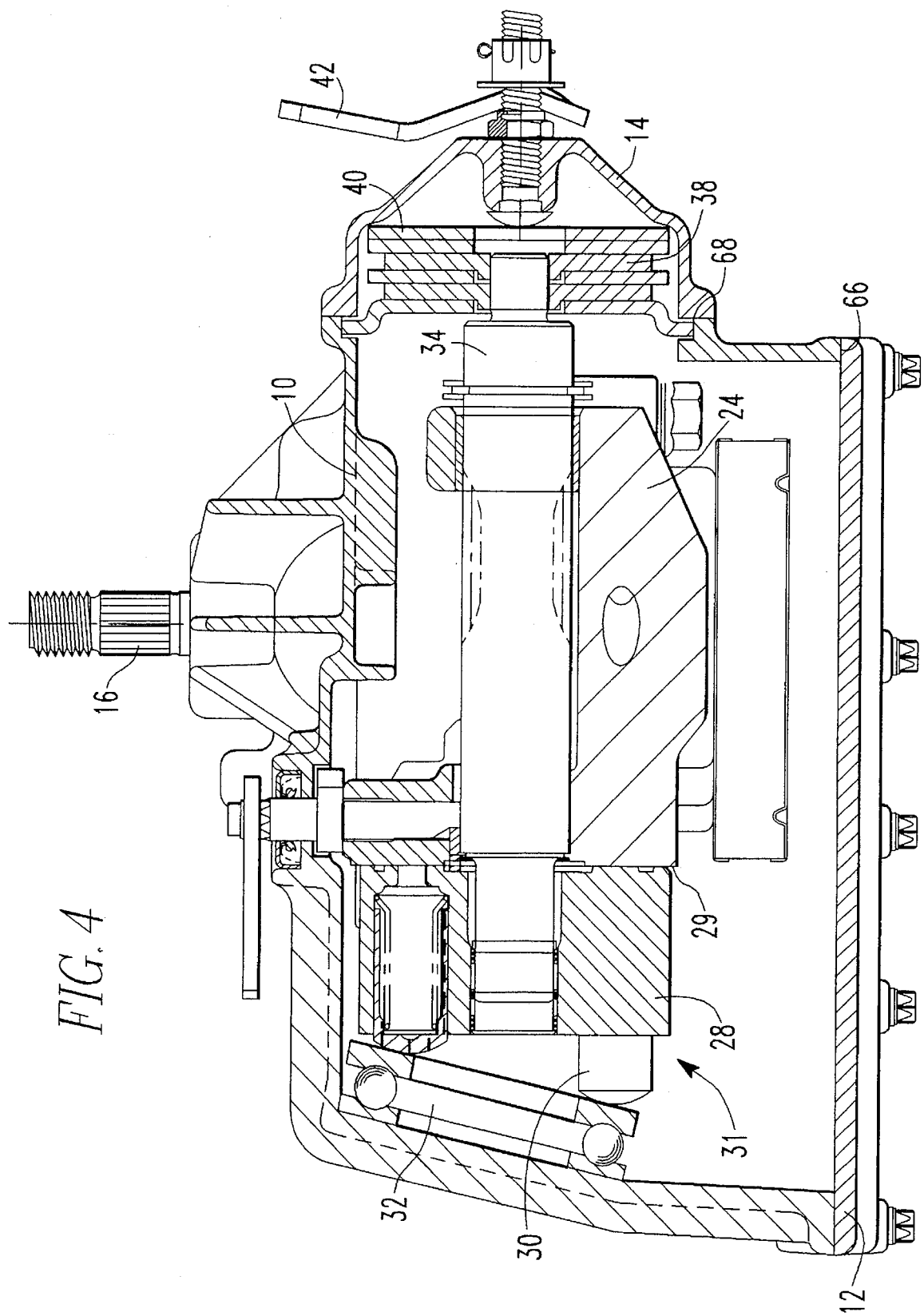
FIG. 4 is a sectional, front view of the axle driving apparatus shown in FIG. 1.
Figure 5:
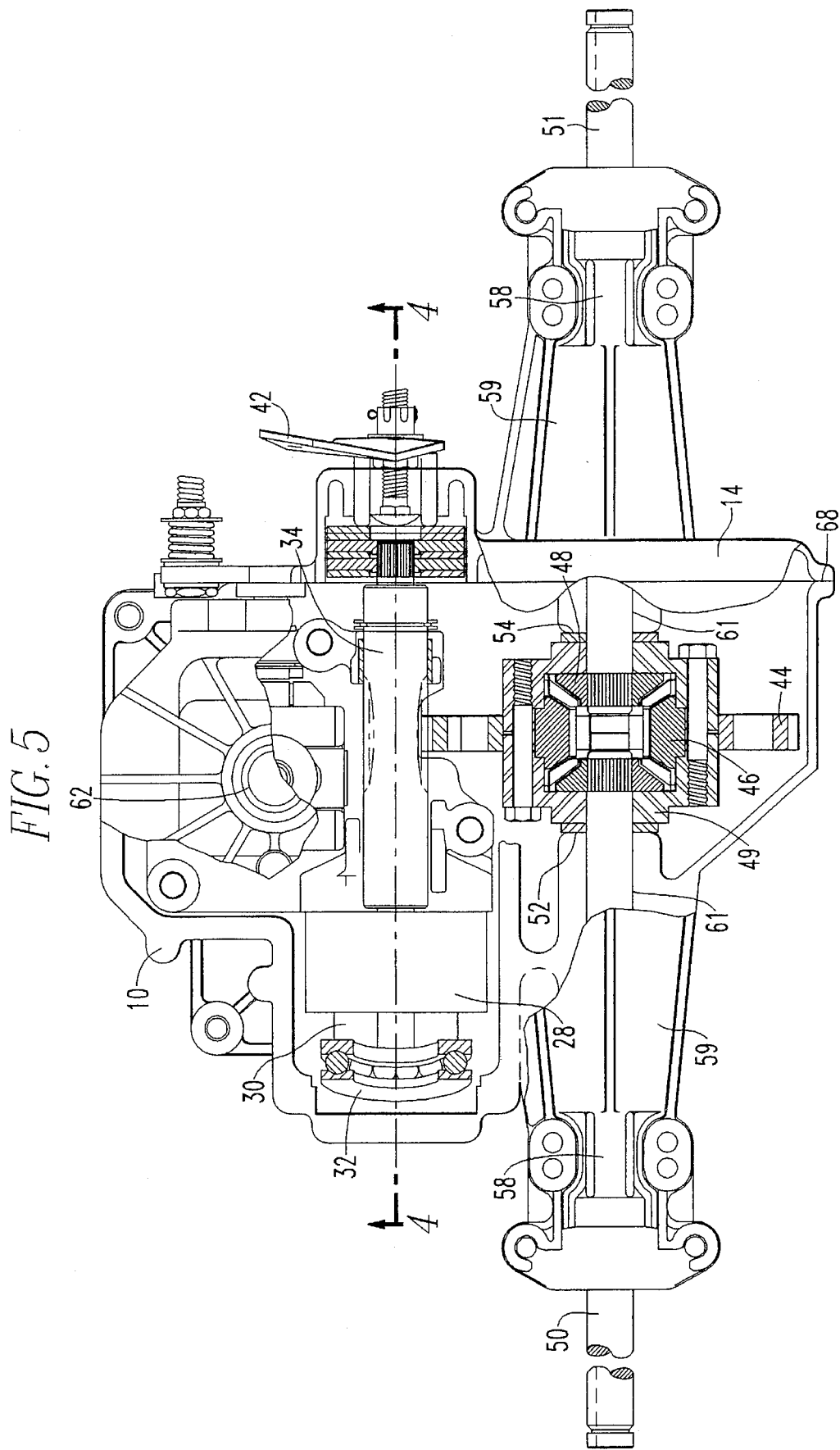
FIG. 5 is a partial sectional, top view of the axle driving apparatus shown in FIG. 1.

Referring now to the figures, wherein like reference numerals refer to like elements, there is shown in FIGS. 1–5 the axle driving apparatus which incorporates the present invention. The casing of the axle driving apparatus is divided into three sections including a main casing 10, a cap plate 12, and an axle cap 14. The main casing 10 supports and maintains the components which comprise the hydrostatic transmission and axle driving mechanism described hereinafter.

The hydrostatic transmission which is supported within the main housing 10 generally comprises a pump shaft 16 which is connected to a pump cylinder 18. The pump cylinder 18 contains a plurality of pump pistons 20 which are engageable with a movable swash plate 22. The pump cylinder 18 is supported on a center section 24, more specifically, on the center section pump support surface 26. The center section 24 also supports a motor cylinder 28, on a motor cylinder support surface 29, which motor cylinder 28 contains a plurality of motor pistons 30. The motor pistons 30 are engageable with a fixed swash plate 32. Integrally connected to the motor cylinder 28 is a motor shaft 34. The pump cylinder 18 and pump pistons 20 comprise a hydraulic pump 21 while the motor cylinder 28 and motor pistons 30 comprise a hydraulic motor 31.

As will be understood by those skilled in the art, the center section 24 contains a plurality of fluid passages, creating a hydraulic circuit, which link the pump pistons 20 with the motor pistons 30 whereby motion of the pump shaft 16 is transferred, via hydraulic fluid flowing in the hydraulic circuit between the pump pistons 20 and the motor pistons 30, to the motor shaft 34. Furthermore, the center section 24 is also provided with a check valve 36 for the purpose of regulating fluid pressure in the hydraulic circuit established between the pump pistons 20 and the motor pistons 30.

Linked to the motor shaft 34 of the hydrostatic transmission is a braking mechanism for controlling the rotational speed thereof. Preferably, fixedly attached to the distal end of the motor shaft 34 is a plurality of rotor plates 38 such that the rotor plates 38 rotate therewith. Provided adjacent to the rotor plates 38 are a plurality of stator plates 40 whereby the stator plates 40 and the rotor plates 38 comprise the motor shaft braking mechanism. Specifically, movement of a lever arm 42 in turn causes a pin 44 to move inwardly towards the stator plates 40 whereby the stator plates 40 are forced into contact with the rotor plates 38 such that the rotation of the motor shaft 34 is frictionally slowed or stopped. It is to be understood that the above described braking mechanism is illustrative only and that other braking arrangements, such a drum brakes or the like, are equally usable with the invention as set forth herein.

Also supported within the main casing 10 is a differential 45 or axle driving mechanism. The differential generally comprises differential gear 44, planet gears 46, bevel gears 48, and supporting end caps 49. As will be understood by those skilled in the art, the motor shaft 34 is rotatably connected to the differential gear 44 which is, in turn, rotatably linked to the bevel gears 48 via planet gears 46. Connected to the bevel gears 48 and rotatable therewith, is an axle comprising a first axle section 50 and a second axle section 51. Rotational movement of the motor shaft 34 is thereby transferred to the axle sections 50, 51 through the differential in a conventional manner.

In construction, the differential, which may also include associated reduction gearing, is first inserted into the main casing 10. Thereafter, the hydrostatic transmission components are inserted into the main casing 10. Finally, the brake mechanism components are linked to the motor shaft. Construction is then completed by attaching to the main casing 10 the cap plate 12 and the axle cap 14. It will be appreciated by those skilled in the art that the cap plate 12 and the axle cap 14 are preferably bolted into attachment with the main casing 10. Furthermore, those skilled in the art will appreciate the steps needed to link the various components within the main casing 10 during this construction procedure.

Specifically, during construction, the differential is supported primarily within the main casing 10 and is prevented from moving therein by being trapped between the surface 52 of the main casing 10, which interacts with one of the end caps 49, and the surface 54 of the axle cap 14, which interacts with the other of the end caps 49. Meanwhile, the center section 24 of the hydrostatic transmission is bolted to the interior of the main casing 10 such that the entire hydrostatic transmission, and all of the associated components thereof, is supported entirely within and by the main casing 10. It is also to be noted that the motor shaft 34 is supported by the center section 34 and extends through an opening in the main casing 10 whereby the components of the brake may be linked thereto. As seen in the figures, the axle cap 14, once attached to the main housing 10, completes the encasement of the motor shaft 34 and the braking mechanism within the main casing 10.

As is further illustrated in the figures, each of the main housing 10 and the axle cap 14 include an axle horn 59 which preferably has bored therethrough a generally circular axle shaft opening 60. Each of the axle horns 59 individually supports one of the axle sections 50, 51. Specifically, the first axle section 50 is supported by the axle horn 59 of the main casing 10 where the distal end of the axle section 50 is supported by an outer landing 58 while the near end of the axle section 50 is supported by an inner landing 61. Similarly, the second axle section 51 is supported by the axle horn 59 of the axle cap 14 where the distal end of the axle section 51 is supported by an outer landing 58 while the near end of the axle section 51 is supported by an inner landing 61. As is conventional, each of the axle shaft openings 60 may be provided with journals to assist the bearing surfaces. Furthermore, the openings 60 may be sealed in a conventional manner. It is also to be noted that bored through the top of the main casing 10 is a generally circular pump shaft opening 62 through which extends the pump shaft 16. Again, this opening may be provided with a journal to assist the bearing surface and may be sealed in a conventional manner.

As described previously, once the components of the differential, the hydrostatic transmission, the braking mechanism, and the axle shafts are arranged relative to the main casing 10, the cap plate 12 and the axle cap 14 are preferably bolted thereto. The cap plate 12, since it does not have the responsibility of having to support any of the components of the hydrostatic transmission, may be constructed of alternate materials such as steel, plastic, or other material of lower cost and/or weight. In particular, it is seen in the figures that the first split line 66 between the main casing 10 and the cap plate 12 lies in a first horizontal plane well below the center section 24. This orientation of the split line 66 with respect to the center section 24 is allowed as a result of the elimination of the need for the cap plate 12 to serve either as a load bearing surface or as part of the hydraulic circuit. Meanwhile, it is also seen that the second, vertical plane occupied by the second split line 68 between the main casing 10 and the axle cap 14 is removed from the hydrostatic transmission owing to the fact that the axle cap 14 also bears no responsibility for supporting any of the components of the hydrostatic transmission.

As a detailed description of the specific construction and operation of the component parts of the hydrostatic transmission, differential, or braking mechanism was not offered as part of this detailed description, the reader is referred to U.S. Pat. No. 5,330,394 to Hauser et al. which provides said information should the reader lack the requisite background needed to gain an understanding of the invention as it is set forth herein.

It should be apparent from the preceding description that this invention has among other advantages, the advantage of providing increased structural integrity with a reduction in both cost and weight.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An axle driving apparatus, comprising;

a main casing;

a cap plate coupled to said main casing along a first split line;

an axle cap coupled to said main casing along a second split line; and a center section supported entirely within said main casing at a location offset from said first split line, said center section supporting a hydraulic pump and a hydraulic motor.

2. The axle driving apparatus as recited in claim 1, wherein said first split line is disposed in a first plane and said second split line is disposed in a second plane.

3. The axle driving apparatus as recited in claim 2, further comprising a pump shaft linked to said hydraulic pump having an axis disposed perpendicular to said first plane and parallel to and offset from said second plane and a motor shaft linked to said hydraulic motor having an axis disposed perpendicular to said second plane and parallel to and offset from said first plane.

4. The axle driving apparatus as recited in claim 2, wherein said first plane is substantially horizontal and said second plane is substantially vertical.

5. The axle driving apparatus as recited in claim 4, wherein said center section is displaced from said horizontal plane.

6. The axle driving apparatus as recited in claim 5, wherein said center section is displaced from said vertical plane.

7. An axle driving apparatus, comprising:

a main casing;

a cap plate coupled to said main casing along a first split line;

an axle cap coupled to said main casing along a second split line;

a center section positioned entirely within said main casing at a location offset from said first split line, said center section supporting a hydraulic pump and a hydraulic motor;

a motor shaft linked to said hydraulic motor;

a differential linked to said motor shaft; and an axle linked to said differential.

8. The axle driving apparatus as recited in claim 7, wherein said center section is bolted to said main casing.

9. The axle driving apparatus as recited in claim 7, wherein said differential is offset from said first split line and said second split line.

10. The axle driving apparatus as recited in claim 7, wherein said first split line is disposed generally in a horizontal plane.

11. The axle driving apparatus as recited in claim 10, wherein said second split line is disposed generally in a vertical plane.

12. An axle driving apparatus, comprising:

a main casing;

a cap plate coupled to said main casing along a first split line, said first split line being substantially disposed in a first plane;

an axle cap coupled to said main casing along a second split line, said second split line being substantially disposed in a second plane;

a center section connected to said main casing supporting a hydraulic pump and a hydraulic motor;

a pump shaft linked to said hydraulic pump having an axis disposed perpendicular to said first plane and parallel to and offset from said second plane;

a motor shaft linked to said hydraulic motor having an axis parallel to and offset from said first plane and perpendicular to said second plane; and an axle linked to said motor shaft having an axis parallel to and offset from said first plane and perpendicular to said second plane.

13. The axle driving apparatus as recited in claim 12, wherein said first plane is substantially horizontal.

14. The axle driving apparatus as recited in claim 13, wherein said second plane is substantially vertical.

15. The axle driving apparatus as recited in claim 14, wherein said center section is disposed within said main casing offset from both said first plane and said second plane.

16. The axle driving apparatus as recited in claim 12, further comprising a differential for linking said motor shaft to said axle.

17. The axle driving apparatus as recited in claim 16, wherein said differential is disposed within said main casing offset from both said first plane and said second plane.

18. The axle driving apparatus as recited in claim 12, wherein said axle comprises a first axle section and a second axle section and wherein said first axle section is supported by said main casing and said second axle section is supported by said axle cap.

19. An axle driving apparatus, comprising;

a main casing;

a cap plate coupled to said main casing section along a first split line, said first split line being substantially disposed in a horizontal plane;

an axle cap coupled to said main casing section along a second split line, said second split line being substantially disposed in a vertical plane;

a center section supported by said main casing having connected thereto a hydraulic pump and a hydraulic motor, said center section being disposed offset from both said first split line and said second split line;

a pump shaft linked to said hydraulic pump and supported by said main casing, said pump shaft having an axis disposed perpendicular to said horizontal plane and parallel to and offset from said vertical plane;

a motor shaft linked to said hydraulic motor having an axis parallel to and offset from said horizontal plane and perpendicular to said vertical plane; and an axle linked to said motor shaft comprising a first axle section and a second axle section wherein said first axle section is supported by said main casing housing and said second axle section is supported by said axle cap and further wherein said axle has an axis parallel to and offset from said horizontal plane and perpendicular to said vertical plane.

* * * * *